United States Patent
Hill et al.

(10) Patent No.: US 11,537,289 B2
(45) Date of Patent: Dec. 27, 2022

(54) INTELLIGENT DATA STORAGE SYSTEM ACTIVITY TRACKING

(71) Applicant: Seagate Technology LLC, Fremont, CA (US)

(72) Inventors: Corey Hill, Broomfield, CO (US); Michael V. Jones, Scotts Valley, CA (US); Carol Joy Gray, El Cerrito, CA (US)

(73) Assignee: SEAGATE TECHNOLOGY LLC

( * ) Notice: Subject to any disclaimer, the term of this patent is extended or adjusted under 35 U.S.C. 154(b) by 44 days.

(21) Appl. No.: 17/248,566

(22) Filed: Jan. 29, 2021

(65) Prior Publication Data

US 2022/0244857 A1 Aug. 4, 2022

(51) Int. Cl.
*G06F 3/06* (2006.01)

(52) U.S. Cl.
CPC ............ *G06F 3/0605* (2013.01); *G06F 3/067* (2013.01); *G06F 3/0622* (2013.01); *G06F 3/0653* (2013.01)

(58) Field of Classification Search
None
See application file for complete search history.

(56) References Cited

U.S. PATENT DOCUMENTS

| | | | |
|---|---|---|---|
| 7,577,729 B1 * | 8/2009 | Umbehocker | G06F 3/0607 709/213 |
| 8,180,882 B2 | 5/2012 | Liss et al. | |
| 8,402,129 B2 | 3/2013 | Dilman et al. | |
| 8,582,450 B1 | 11/2013 | Robesky | |
| 9,547,647 B2 | 1/2017 | Badaskar | |
| 10,809,936 B1 * | 10/2020 | Kaushik | G06F 11/321 |
| 2019/0286371 A1 * | 9/2019 | Takagawa | G06F 11/3058 |
| 2021/0081111 A1 * | 3/2021 | Larsen | G06F 3/0629 |
| 2021/0208781 A1 * | 7/2021 | Chen | G06F 3/0614 |
| 2021/0240381 A1 * | 8/2021 | Sato | G06F 3/0616 |
| 2021/0294497 A1 * | 9/2021 | Deguchi | G06F 3/067 |
| 2022/0066679 A1 * | 3/2022 | Hieb | G06F 11/0727 |

* cited by examiner

*Primary Examiner* — Christopher D Birkhimer
*Assistant Examiner* — Ralph A Verderamo, III
(74) *Attorney, Agent, or Firm* — Hall Estill Law Firm

(57) ABSTRACT

A data storage system can intelligently track activity by storing data in the form of data sets to a data repository of a data storage system with the data repository consisting of a memory of one or more data storage devices. An analysis engine of an activity module may be used to collect a first set of operational information associated with the data repository prior to creating a tracking strategy with the activity module that prescribes at least one alteration to what operational information is collected. A second set of operational information associated with the data repository can be collected with the second set of operational information being different than the first set of operational information in accordance with the tracking strategy. A dashboard is generated to display the collected first and second sets of operational information to a user.

20 Claims, 5 Drawing Sheets

| SOURCE | DESTINATION | SECURITY | COMPRESSION | POLICY |
|--------|-------------|----------|-------------|--------|
| USER 3 | PBA X-Y | KEY A | LOSSLESS | 1, 4, 5, 9 |
| USER 1 | PBA X-Y | KEY A | LOSSY | 1, 9 |
| USER 6 | PBA X-Y | KEY A, B | LOSSLESS | 4, 5, 9 |
| USER 2 | PBA X-Y | KEY B, C | LOSSLESS | 9 |
| USER 3 | PBA X-Y | KEY A | LOSSLESS | 1 |
| USER 4 | PBA X-Y | KEY C | LOSSLESS | 1, 5, 9 |
| USER 5 | PBA X-Y | KEY B | LOSSY | 1, 2, 3 |
| USER 1 | PBA X-Y | KEY A | LOSSLESS | 6, 8, 9 |
| USER N | PBA X-Y | KEY D | LOSSLESS | 1, 5, 6, 8, 9 |

INTELLIGENT DATA STORAGE SYSTEM ACTIVITY TRACKING

SUMMARY

The present disclosure is generally directed to tracking activity in a data storage system employing at least one non-volatile memory.

Embodiments of a data storage system intelligently track activity by storing data in the form of data sets to a data repository of a data storage system with the data repository consisting of a memory of one or more data storage devices. An analysis engine of an activity module collects a first set of operational information associated with the data repository prior to creating a tracking strategy with the activity module that prescribes at least one alteration to what operational information is collected. A second set of operational information associated with the data repository collects the second set of operational information that is different than the first set of operational information in accordance with the tracking strategy. A dashboard is generated to display the collected first and second sets of operational information to a user.

Other embodiments of a data storage system store data in the form of data sets to a data repository of a data storage system with the data repository consisting of a memory of one or more data storage devices. An analysis engine of an activity module is used to collect operational information associated with user accesses to at least one of the data sets prior to compiling the operational information into at least one activity with the activity module. A dashboard is generated to display the at least one activity to a user selected by the activity module. At least one operational policy for a pending data access request to the data repository is then adjusted in response to the at least one activity shown by the dashboard.

A data storage system, in some embodiments, stores data in the form of data sets to a data repository of a data storage system with the data repository consisting of a memory of one or more data storage devices. An analysis engine of an activity module collects a first set of operational information associated with the data repository prior to creating a display strategy with the activity module that prescribes at least one alteration to how collected information is displayed to a user. A first dashboard is generated to display the collected operational information to a first user in accordance with the display strategy and then adjusted to a second dashboard in accordance with the display strategy prior to displaying the dashboard to a second user.

DETAILED DESCRIPTION

In accordance with assorted embodiments, a data storage system employs intelligent tracking of data and system activity to provide optimal, customized system performance and resource allocation.

Figure 1:
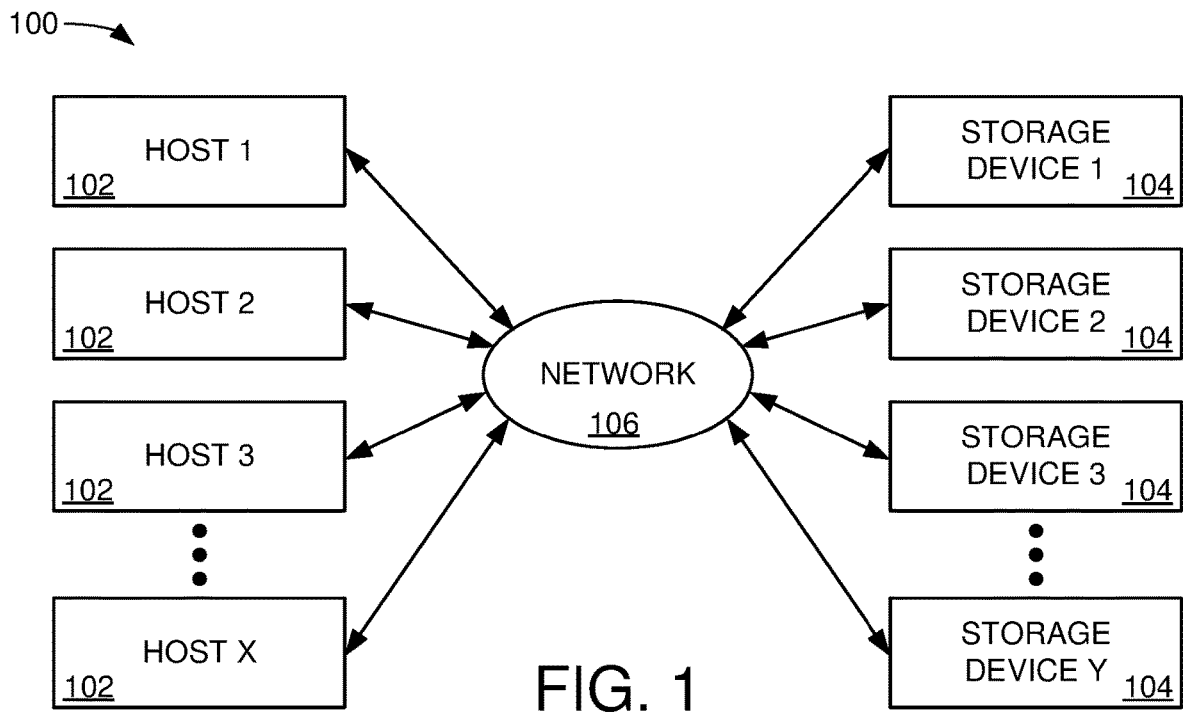
FIG. 1 provides a functional block representation of a data storage system in which various embodiments can be practiced.

FIG. 1 depicts a block representation of an example data storage system 100 in which assorted embodiments are practiced. The system 100 connects any number (X) of hosts 102 to any number (Y) data storage devices 104 via one or more wired and/or wireless networks 106. The various hosts 102 can be positioned in any location with any type, performance, and capability to create, transfer, and receive data stored in one or more data storage devices 104. The assorted data storage devices 104 are not limited to a uniform configuration and can have any capacity, performance capability, and type of memory to store data. It is contemplated that the respective data storage devices 104 employ non-volatile memory, such as solid-state memory cells and/or rotating magnetic media.

With the assorted hosts 102 respectively creating data and/or data access requests to the data storage devices 104, separate ownership, security, compression, encryption, and mapping may be used. Such separate, and potentially different, data and data access configurations emphasize accurate tracking of data, data accesses, and the memory in which data is stored. However, greater numbers of hosts 102, and more sophisticated separate data configurations, correspond with inefficient system 100 activity tracking. In addition, system activity tracking has traditionally been available only to system administrators and in formats that do not intelligently convey the status, performance, and/or vulnerabilities of data, hosts 102, or data storage devices 104.

Figure 2:
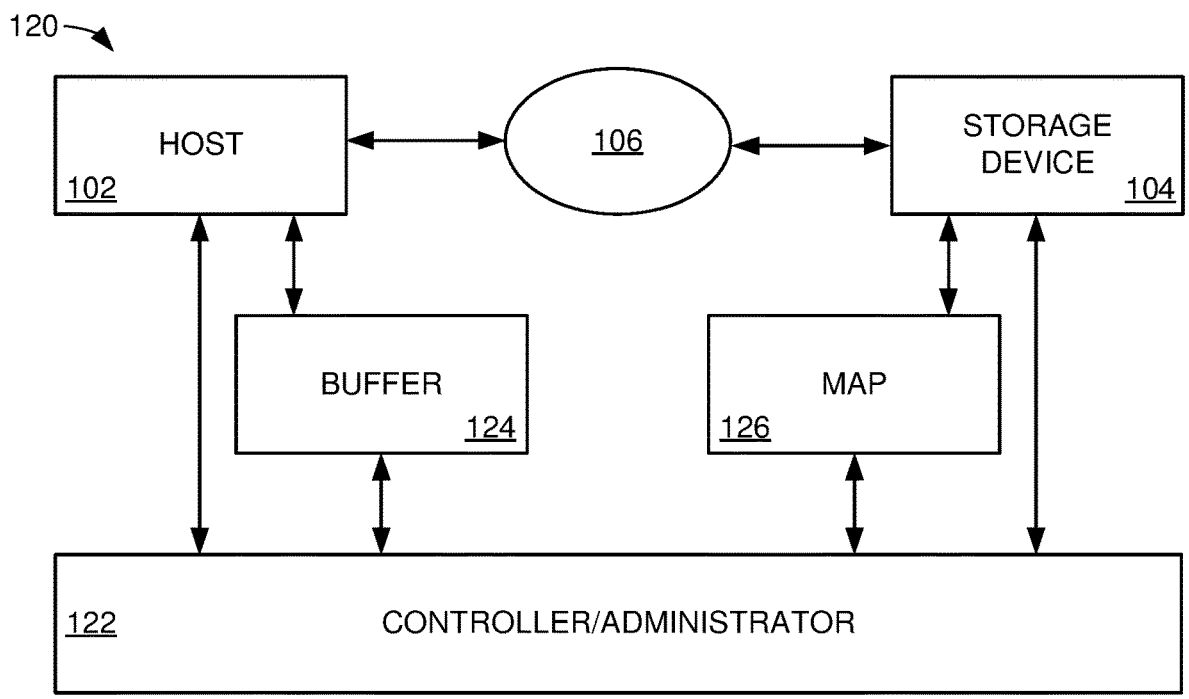
FIG. 2 shows aspects of an example data storage device arranged in accordance with some embodiments.

FIG. 2 depicts a block representation of portions of an example data storage system 120 arranged to provide data and system activity tracking in accordance with some embodiments. A single host 102 is shown connected to a single data storage device 104 that employs at least one non-volatile memory, but such arrangement is not limiting or required as additional hosts 102, data storage devices 104, and network interconnections 106 can be employed concurrently and sequentially. Each system 120 host 102 and data storage device 104 is connected to at least one activity controller 122 that services as an administrator of policies dictating how data is stored, retrieved, and maintained.

The activity controller 122 can selectively utilize one or more buffers 124 to temporarily store data flowing back and forth between hosts 102 and data storage devices 104. It is contemplated that the activity controller 122 can select between more than one buffer 124 data repository, such as different volatile and/or non-volatile memories with different data access latencies, error rates, physical sizes, and/or storage capacities. As data flows to the data storage device 104, a map module 126 is activated by the activity controller 122 to describe at least the logical and physical locations of data in memory of the device 104.

In response to data generated by the host 102 being stored in the data storage device 104 and/or data stored in the data storage device 104 being accessed by the host 102, the activity controller 122 logs various status, performance, and vulnerability metrics. For instance, the controller 122 can monitor, track, and log, the initial request for data storage, or retrieval, the overall time to carry out the request, the error rate of data accesses to the data storage device 104, the location of data in the memory of the data storage device 104, the compression of stored data, the number of accesses to the physical memory cells of the data storage device 104, the number of accesses to the data currently stored in the data storage device 104, the background operations conducted on the data, and the owners of the assorted requests for the data in the data storage device 104. While monitoring and logging these, and other, system activities and metrics can be useful for the activity controller 122 to organize data, pending data access requests, and logical units, such as garbage collection units, namespaces, and/or containers, the addition of multiple hosts 102 and/or data storage devices 104 quickly jeopardizes overall system performance by tracking and logging various system activities and metrics, particularly when different hosts 102 have sophisticated and/or different ownership, performance guarantees, and/or data configurations.

Figures 3, 4:
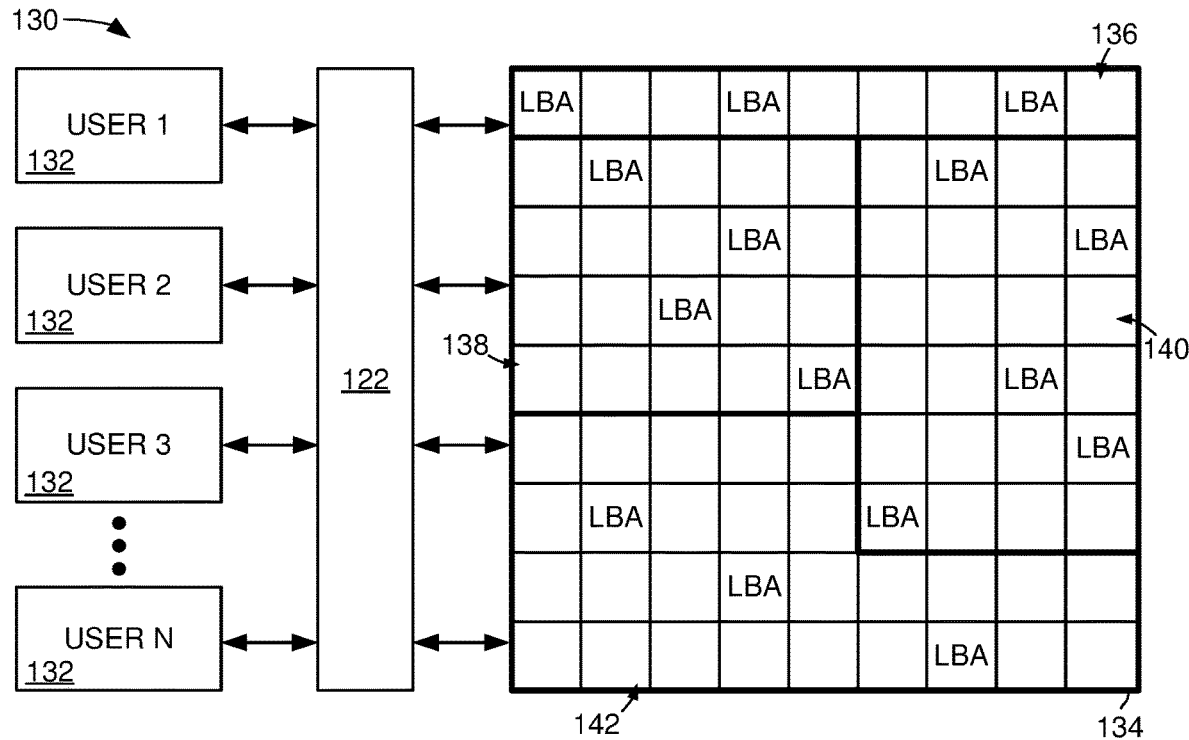
FIG. 3 shows a block representation of portions of an example data storage system configured in accordance with some embodiments.
FIG. 4 illustrates an example activity view compiled from a data storage system in assorted embodiments.

FIG. 3 conveys portions of an example data storage system 130 in which an activity controller 122 carries out various embodiments of system activity and metric tracking. The activity controller 122 can direct operations from any number of users 132, which can be human or other non-computing entity acting as a host for access to a data repository 134. The data repository 134 is visually shown in FIG. 3 as a continuous grid of logical block addresses (LBA), but can be any number of different memories resident in different data storage devices. For example, the constituent repository LBAs can correspond with physical block addresses (PBA) located in separate data storage devices and memories located in different locations, such as different cities, countries, and/or continents.

It is noted that various portions of the data repository 134 can be logically divided into one or more units, such as namespaces, garbage collection units (GCU), calibration groups, containers, and partitions. One or more data storage controllers can allocate the various logical and physical aspects of the data repository 134 over time to provide sufficient data reliability, security, and availability. A storage controller can execute one or more operational policies that dictate how, where, and when data is stored and retrieved. For instance, operational policies can dictate what can access data once stored (ownership), what can update stored data, how data is compressed, what encryption is applied to data (security), and what logical and/or physical addresses are available for data.

In the non-limiting example of FIG. 3, a first user has data stored in a namespace 136 that the first user has exclusive ownership while data from a second user is stored redundantly in multiple different namespaces 138 & 140. Portions of data from a third user can be temporarily, or permanently, stored in addresses 142 dedicated to shared storage for any connected user. With the various operational policies in place and, potentially, providing different parameters for how data is handled, where data is stored, and when data can be accessed, the activity controller 122 can detect, log, and track the execution of the assorted operational policies. That is, the activity controller 122 can log at least how data is stored/retrieved, when data is stored/retrieved, where data is stored/retrieved, and who requested access to data. It is noted that the activity controller 122 may additionally monitor and track operations to memory cells that are not initiated by user/host requests, such as cell calibrations, garbage collections, mapping, error correction, and allocation of memory for overprovisioning.

Although tracking data accesses and memory cell operations can be conducted by the activity controller 122, the presence of numerous different users 132 having different volumes of activity associated with different data ownerships, security, and permissions can degrade data access performance of the data storage system 130. As a result of heightened volume and/or complexity of system acidity, the activity controller 122 may be slowed or suspended to preserve data access performance, which jeopardizes the accuracy of tracked operations and the ability of the controller 122 to provide current status, statistics, and performance that can be used to optimize speed, reliability, and/or security of data accesses.

The complexities and operational volatility associated with tracking activity from multiple different users 132 can be exacerbated by static activity tracking policies that dictate how and what the activity controller 122 monitors and logs for tracking. Accordingly, various embodiments are directed to intelligently altering tracking controller 122 operational policies to provide accurate and efficient status of system activity without degrading average or peak data access performance for the system 130.

Through dynamic activity tracking operational policies, tracked parameters, status, statistics, and performance can be intelligently formatted, analyzed, and displayed to authorized users, administrators, and hosts to allow a distribution of tracked information and a reduction in time and processing resources needed to translate the tracked information into data access operational parameter changes that can optimize the performance of the system 130. By correlating current, pending, and predicted workloads to various logical units, such as namespaces, containers, and GCUs, the activity controller 122 can intelligently operate with policies selected to provide accurate tracking without degrading the actual and/or potential data access performance to the data repository 134.

FIG. 4 depicts a block representation of portions of control dashboard 150 that is compiled, analyzed, and conveyed by an activity controller monitoring at least one memory connected to one or more users/hosts. The dashboard 150 can be configured by an activity controller 122 to show any detected and predicted operational parameter, statistic, and performance for any aspect of a data storage system. While not required or limiting, the example view of FIG. 4 displays a chronological list of detected data access activities with the source of the activity, destination of any data movement, operational policies conducted, and operational statistics involved, as well as the status, workload, and performance of the involved memory cells and/or logical unit.

It is noted that the compilation of the various metrics and tracked operational parameters can be resource and time intensive for the activity controller, particularly when different users concurrently conduct data accesses to different memories with different operational policies and permissions. It is further noted that the compilation of tracked metrics and/or performance, such as the view shown in FIG. 4, can be more resource and time intensive than if raw tracked data is logged and depicted. Hence, embodiments of the activity controller can control the expenditure of system resources by altering how tracked data is compiled and shown along with who receives the compiled information and what level of granularity conveyed. The ability to adjust the operational policies of the activity controller allows for optimized activity tracking, formatting, compiling, analyzing, and delivery to one or more recipients, such as an administrator, user, or other host.

Figure 5:
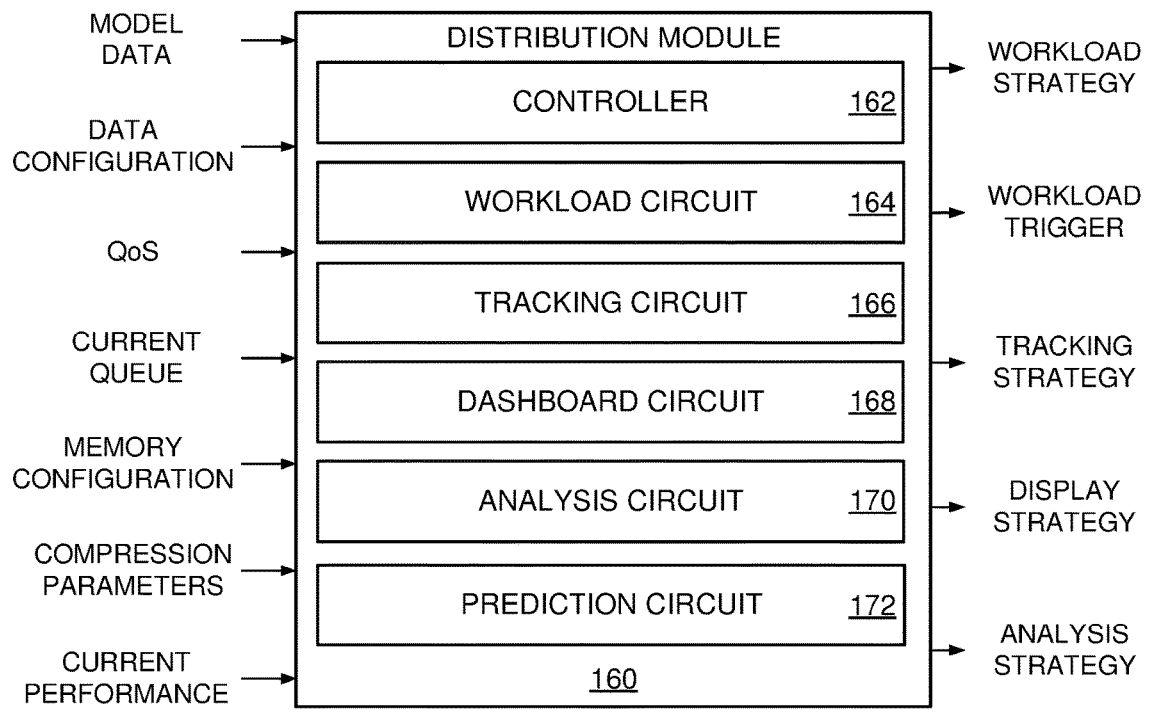
FIG. 5 depicts a block representation of an example activity module that can be employed in various embodiments of a data storage system.

The activity controller 122 employs circuitry of an activity module 160 to analyze current and predicted system workloads and performance to develop a tracking strategy that preemptively prescribes alterations to activity controller operational policies to provide optimal use of system resources to allow for heightened system performance, reliability, and/or security. FIG. 5 depicts an example activity module 160 that can be employed in a data storage system in accordance with assorted embodiments to schedule and carry out intelligent tracking, analyzing, compiling, and delivery to one or more recipients. The module 160 can utilize one or more controllers 162 to translate a variety of input information into at least a workload detection strategy, a workload trigger, tracking strategy, display strategy, and operational strategy that can be selectively, and concurrently, conducted to provide data access optimization view of dynamic data access workloads to various memories from numerous different users/hosts.

The module controller 162 may be a standalone circuit, such as a microprocessor or other programmable circuitry, resident anywhere in a data system, such as in a standalone node, network node, host, or data storage device. Regardless of where a controller 162, and module 160, is located in a data system, the data access activity to one or more memories can be monitored and logged along with the current memory configuration, security protocol, quality of service criteria, and data locations. The module controller 162 can input past logged information, such as error rate, data access latency, location of stale data, and garbage collection activity. While current and past information about the data system in which the module 160 is resident can be procured, the controller 162 may additionally refer to one or more data models pertaining to other data storage systems, memories, or host access activity.

While not limiting, the activity module 160 can input assorted current and past logged conditions for one or more memories of a data storage system. For instance, the current physical block addresses of various calibration groups, the addresses of past data access errors and failures, the current physical and logical configurations of memory cells, and the pending data operations to the memory cells can be utilized individually, and collectively, to understand current namespace configurations and performance as well as future cell arrangements for namespace optimization.

The module controller 162 can operate alone to generate and maintain the various strategies to control current and future namespace workloads, configurations, and data access operations. However, some embodiments employ assorted circuitry to aid the module controller 162 in efficiently creating, altering, and executing the respective output strategies. A workload circuit 164 can assist the module controller 162 in translating the various input information into a workload strategy that has one or more triggers that correspond with a namespace operational policy change in order to mitigate, or eliminate, namespace data access performance degradation. It is noted that while a namespace logical unit is discussed in association with workloads, such granularity is not limiting and workloads and various module strategies can be generated for different granularities, such as by data storage device, memory die, GCU, or source of data.

Although not required or limiting, the workload circuit 164 can generate and maintain multiple workload strategies for separate namespaces and/or memory die which allows for concurrent optimization of the respective memory cells through the execution of different operational policy changes prescribed by the respective operational strategies in response to detected, or predicted, activity that meets a predetermined workload trigger. For instance, a first namespace may have a first workload strategy generated by the workload circuit 164 that prompts the execution of a first set of data tracking, compilation, analysis, and/or data access operational policy changes, in response to a first trigger being met while a second namespace of a data storage device has a different workload strategy and triggers that prompt a different set of operational policy changes customized to the second namespace based on the workload to that namespace.

In order to induce customized and optimized system activity tracking, compilation, and delivery, the activity module 160 can generate, maintain, and selectively execute a tracking strategy, display strategy, and operational strategy based on past, current, pending, and model data pertaining to system performance. A collection circuit 166 can contribute to the various strategies by determining what system activity is tracked, how the activity is tracked, and what granularity is used to track the activity. The collection circuit 166 may be considered an analysis engine, along with other circuitry of the module 160, as assorted aspects of the structural, operational, and policy of a data storage system can be evaluated to determine what is going to be tracked, and how.

The ability to adapt what is tracked allows the collection circuit 166 to customize what system resources are utilized and ensure expended resources are optimal for workloads to maintain, or increase, data access performance. For instance, the collection circuit 166 can adapt tracking data accesses to a physical die of memory cells to tracking host-initiated data read and write requests to a namespace. In such example, the collection circuit 166 prescribes to the tracking strategy that a first workload corresponds with logging each operation of each memory cell in a die, such as data refreshes, data reads, data writes, data mapping, data moves, garbage collection, and error corrections, while a second workload corresponds with logging each data read and each data write to a namespace.

The adjustment of both what is being tracked and the granularity of the tracking allows a tracking strategy to quickly pivot system resources so that dynamic workloads do not degrade overall system performance. The collection circuit 166 may further determine what parameters, metrics, and statistics are tracked. As a non-limiting example, the collection circuit 166 may prescribe that the source of a memory cell access be tracked, the permissions used to access data, how data was processed with compression and/or encryption, and various statistics, such as error rate, latency, time to completion, and physical block address of data accesses.

Through the adjustment of what activity is tracked and what metrics are tracked during an activity, the collection circuit 166 can maintain the tracking strategy as customized and optimized to current and predicted system conditions. The prescription of granularity changes in the tracking strategy, such as logging activity to each memory cell, plane of memory cells, die of memory cells, data storage device, or logical group of memory cells, further creates a sophisticated and optimized strategy that accumulates sufficient volumes of information for the activity module 160 to ascertain the status of the data storage system as well as potential vulnerabilities/opportunities to increase system performance and consistency.

An analysis circuit 168 can translate the information gathered as directed by the tracking strategy and collection circuit 166 into decisions that can be made by the activity module 160 to alter an existing strategy and/or operational policy changes for tracking of activities and/or displaying the tracked information to one or more hosts/users. In some embodiments, the analysis circuit 168 determines who sees tracked information. The analysis circuit 168 can contribute to the display strategy by prescribing what information is shown to which host/user, which may be less than the entire volume of tracking information. The display strategy may further involve different views and tracked information delivery to different hosts/users that are customized to the permissions assigned to the receiving host/user, such as error mitigation, data mapping, background operation execution, and namespace memory cell allocation.

A display circuit 170 can provide additional guidance for the display strategy, such as what lens is used to convey tracked information to a host/user, how often tracked information is updated, the granularity of displayed information, if the tracked information is shown as an interactive dashboard, and if raw and/or translated information is displayed. An interactive dashboard allows a host/user to select and/or change the information being shown, such as between different granularities, activities, and/or activity sources. Raw tracked information may be unformatted while translated information is formatted for host/user consumption, which can involve simplified addresses, descriptions, resulting performance, and identification tags assigned by the activity module 160 during tracking.

The execution of one or more strategies generated by the activity module 160 provides a balance of data access request satisfaction speed with the scope, depth, and granularity of system activity tracking in a manner that meets a predetermined Quality of Service (QoS) standard, deterministic input/output window, or performance threshold. The ability to intelligently the satisfaction of track data access requests along with memory cell operations provides valuable information that allows the activity module 160 to prescribe and/or execute memory cell operational policy changes that optimize current and/or future system performance, such as data access speed, reliability, and security. The correlation of intelligent system activity tracking with detected, and predicted, workloads to various portions of memory ensures system resources are utilized in an optimal manner.

The generation of assorted aspects of the workload and other strategies can provide sophisticated reactions to encountered namespace workloads as well as proactive actions that mitigate performance degradation due to activity tracking when conditions and/or activity change. The proactive generation of the workload and other strategies by the activity module 160 allows the module controller 162 to execute workload, namespace, data access request, and memory cell operation control actions quickly and efficiently once a workload trigger is reached. In contrast, purely reactive generation of namespace and/or memory cell operation manipulation actions by the activity module 160 would involve additional processing and time to evaluate and generate the proper action(s) to establish workload control and provide continued namespace data access performance to satisfy one or more predetermined expectations.

While the saving of processing overhead, the configuration of the respective workload and activity tracking strategies with both reactive and proactive actions provide intelligent long-term namespace and memory cell optimization that cannot be achieved with static operational policies or purely reactive generation of action(s) to control and optimize the operation of memory cells in view of workload. The generation of proactive actions and identifying future workload and namespace operational performance for the respective strategies is aided by a prediction circuit 172. A prediction circuit 172 can input assorted current and past operations, actions, and activity, along with model data from other memory, to forecast at least one future namespace operational condition, data access request, or data access performance.

The accurate prediction of memory, data access request, metadata, and namespace conditions along with data access performance allows the respective strategies generated by the activity module 160 to have one or more operational policy adaptations to mitigate, or completely avoid, a forecasted future operational occurrence that can degrade system performance, reliability, or security. The prediction circuit 172 can further forecast how long different strategy actions will take for varying system conditions, which allows the module 160 to quickly adjust between different policy changes to provide a practical workload control and maintain operational performance without unduly stalling or degrading overall data storage system performance.

With the tracking strategy prescribing what system metrics, statistics, and activities to monitor while the display strategy prescribes how tracked information is shown to predetermined users/hosts/administrators, the activity module 160 can adapt how system resources are used with respect to the actual, pending, and/or predicted workload to portions of a data repository, such as a namespace, physical memory die, range of PBAs, or range of LBAs. The gathering and display of assorted system information allows the activity module 160 to analyze the information with the analysis circuit 168 to prescribe one or more operational policy changes as part of the operational strategy. That is, the activity module 160 can generate, update, and execute the operational strategy that prescribes at least one operational policy change in response to a workload trigger and/or a tracked metric and/or statistic reaching a predetermined threshold.

As a non-limiting example of the operational strategy, the activity module 160 can prescribe automatic changes to how data is written to memory, read from memory, moved within a memory, mapped, buffered, compressed, encrypted, and organized. The operational strategy, in some embodiments, prescribes changes to what, where, and how background operations are conducted on some, or all, of a data storage device. It is contemplated that the operational strategy prescribes a distribution of tracked system information to decentralized users/hosts/administrators, which allows more analysis to be conducted for less overall system resources. The operational strategy can, additionally or alternatively, prescribe alterations to memory allocation policy, which can adapt how memory cells are used, such as for overprovisioning, namespaces, buffers, or spare cells.

Figure 6:
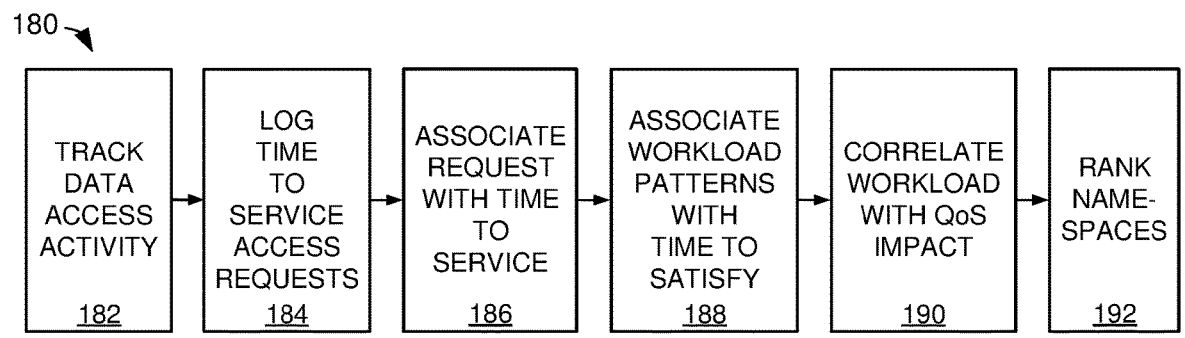
FIG. 6 is a timeline of an example workload procedure that may be conducted in a system in accordance with assorted embodiments.

FIG. 6 depicts an example workload detection procedure 180 that can be carried out in a data storage system via an activity module in accordance with various embodiments. Data accesses are tracked in step 182 by the activity module. As such, the activity module can track assorted data access metrics concurrently or sequentially. The overall time to service a data access request is logged by the activity module in step 184. It is noted that the overall time to satisfy a data access request is not the only activity tracked in 182, but such activity tracking can be prioritized by redundantly monitoring and interpreting the elapsed time from submission of a data access request by a host to the return of data, in the case of a read request, or the writing of data to a namespace, in the case of a write request.

The logged time to service a data access request can be evaluated in isolation or with the service times of other data access requests to a namespace to determine how long a new data access request to a namespace would take to service. As a result of the logging of actually completed data access requests in step 184 along with the association of new data access requests with an estimated time to service, the activity module can compile the workload for a namespace. That is, the combination of previously satisfied data access requests and estimated time to service new requests provides enough information for an activity module to determine the workload for a namespace. Hence, the activity module generates and maintains a workload value for each namespace that corresponds to how long a data access request takes to be satisfied. A namespace workload further corresponds to the memory cell operational performance of a namespace as well as the current channel and processor capabilities that service memory cells of a namespace.

With the logging of actual request satisfaction times in step 184 and the association of future requests with request satisfaction times in step 186, the activity module can compile workload values over time for each namespace of a device/system. The tracking of workloads to various namespaces allows the activity module to identify various workload patterns that reliably indicate future data access request satisfaction times, processing requirements, and buffer memory requirements in step 188. The combination of the determination of namespace workload and the association of workload patterns with future namespace time to satisfy a data access request provides ample information for the activity module to correlate current namespace workload with an impact to predetermined namespace operational performance and/or power consumption expectations in step 190, such as QoS, deterministic window, error rate, and average data access latency.

Through the tracking of workloads and correlation of those workloads with impact to predetermined namespace operational performance, the activity module can rank the various available namespaces in step 192 with the aid of the ranking circuit. Such namespace ranking can organize namespaces by availability, efficiency, reliability, read performance, or write performance. For instance, the activity module can rank namespaces in step 192 by which namespaces can service a request most quickly (availability), with least processing consumption (efficiency), with least error rate (reliability), read request latency, average request service time, or write request latency. The ranking of namespaces allows the activity module to generate and adjust operational strategy policy actions that provide the greatest opportunity to satisfy performance expectations in view of current and future predicted namespace workloads.

Figure 7:
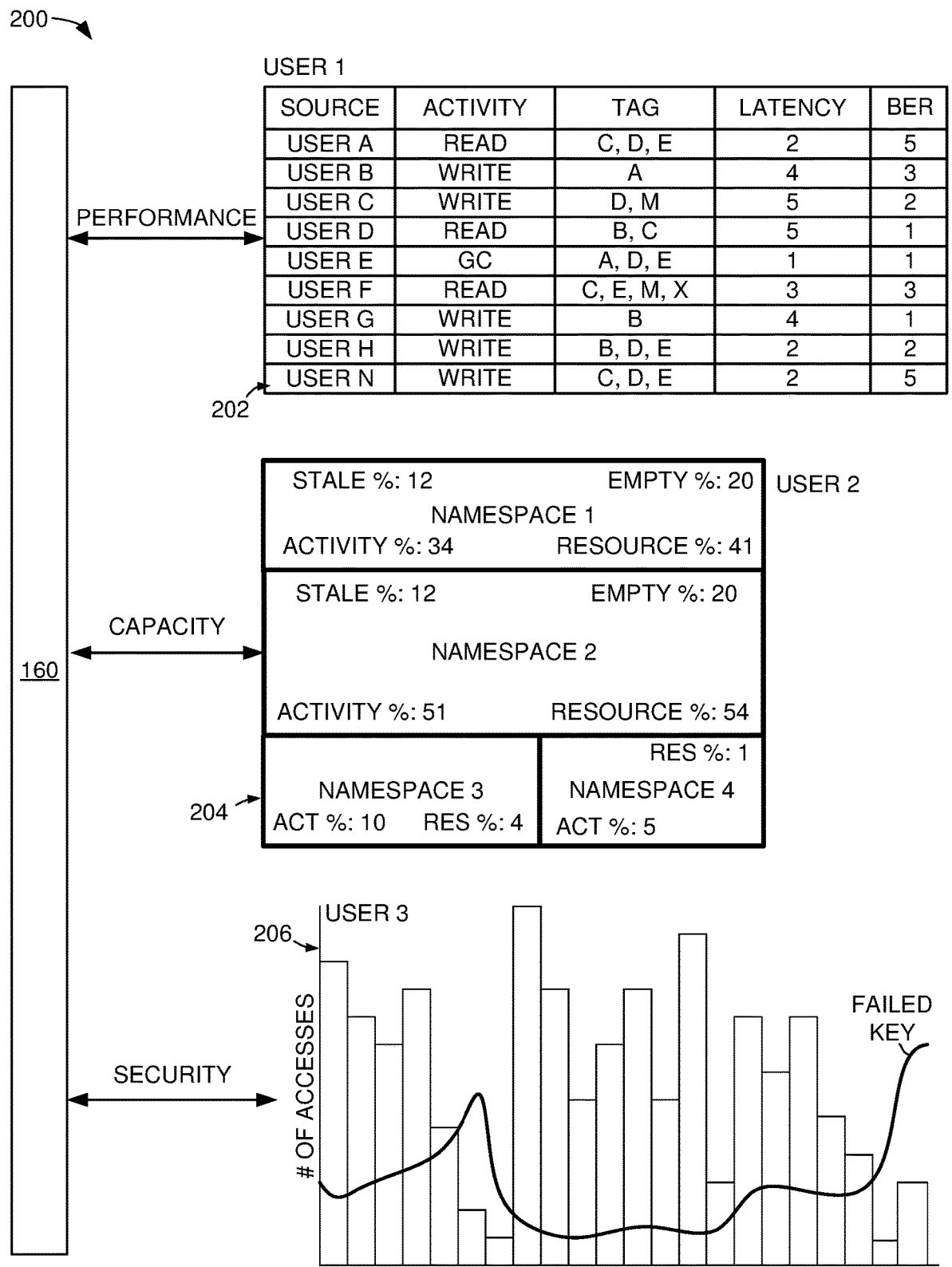
FIG. 7 depicts a block representation of portions of an example data storage system utilized in accordance with some embodiments.

FIG. 7 depicts a block representation of portions of an example data system 200 in which assorted embodiments can be practiced. As part of a tracking strategy executed in combination with the display strategy, system workloads, activity, and available resources can be detected to prompt the compilation and display of the first dashboard 202 to at least one predetermined user/administrator. The first dashboard 202 conveys an example grid view that displays raw and/or translated system information to various portions of memory concurrently. The activity module 160 can alter what information is shown in the first dashboard 202 as well as whom has access to the information. Hence, the activity module 160 can broadcast the first dashboard 202 to multiple different users, but with different information displayed in accordance with the user's security clearance and/or available resources to interpret the displayed information.

The decentralized distribution of the first dashboard 202, as prescribed by the activity module 160, can correspond with different permissions and capabilities for the recipient host/user/administrator to interpret the dashboard information and execute portions of the operational strategy. For instance, different users can be given different permissions to analyze information from the first dashboard 202 and execute one or more policy changes dictated by the preexisting operational strategy, such as suspending background operations, altering the allocation of memory cells for a namespace, or prioritizing data access to a particular namespace to meet a guaranteed performance metric.

At any time and in response to any automatic or manual trigger event, the activity module 160 can alter the first dashboard 202 to the second dashboard 204, which conveys a map of portions of a system data repository that can consist of one or more different memories from different/separate data storage devices. The map of the second dashboard 204 can provide a user/host/administrator with an easier understanding of the activity to assorted logical, and physical, data addresses than the grid view of the first dashboard 202. However, the second dashboard 204 can correspond with greater system processing than the grid of the first dashboard 202 due to the translation of raw data into a visual map. Yet, the map of the second dashboard 204 can convey information more efficiently than the grid view due to the actual location of the activity being immediately apparent compared to simply being referenced as an address.

The map view of the second dashboard 204 may be provided to some hosts/users/administrators while the third dashboard 206 is shown to other users/hosts/administrators. The third dashboard 206 translates raw tracked system information into one or more concurrent graphs that can illustrate how, when, and where system activity, resources, and vulnerabilities occur over time. While a select few activities are graphed in the third dashboard 206 of FIG. 7, it is contemplated that numerous different types of graphs, such as line, bar, and pie, can be compiled and displayed for various activities, data sources, destinations, performances, and identifying tags.

Various embodiments can create, update, and display multiple different dashboards 202/204/206 to different hosts/users/administrators in response to particular times, activities, performances, workloads, or user selection. The ability to concurrently display the same, or different, data with different dashboard views can provide robust visual representations that can quickly allow a user to interpret what is occurring in the data storage system. Continual, or sporadic, updating of information in displayed dashboards by the activity module allows for changes in what tracked information is shown, who sees the dashboard, what permissions are allowed to be conducted in view of the displayed information, and how the tracked information is conveyed. As an example, the activity module can alter the granularity of tracked information shown in a dashboard in response to an encountered workload trigger, activity module prompt, or manual user/host prompt in the event an interactive dashboard is provided.

Figure 8:
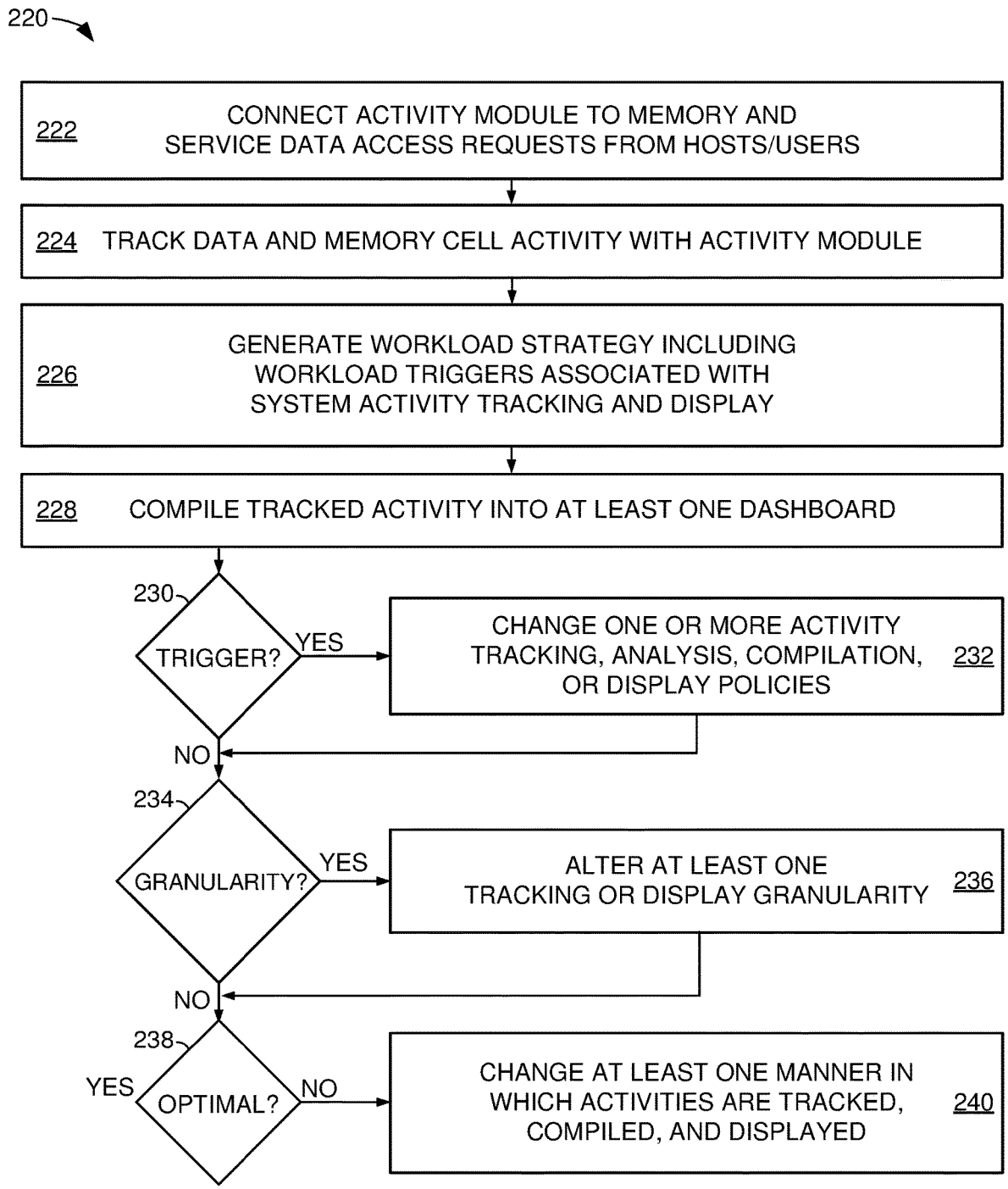
FIG. 8 is a flowchart of an example activity tracking routine that can be carried out with the embodiments of FIGS. 1-7.

FIG. 8 conveys an example activity tracking routine 220 that can be carried out with the assorted embodiments of FIGS. 1-7 to control what data storage system activity is tracked, who sees the tracked information, how the tracked information is displayed, and what solid-state memory cell operational policy changes can be conducted to optimize system performance, reliability, and security. Connection of an activity module to a memory, such as a solid-state data storage device, allows for the initialization of the memory to service data access requests from hosts/users external to the memory, such as a third-party human user, in step 222. It is contemplated that the activity module may oversee, or dictate, the establishment of various logical units, such as overprovisioned groups, garbage collection units, and zoned namespaces, that can occupy any physical and logical data block addresses in one or more data storage devices, die of memory cells, and planes of memory cells.

Activity to the assorted memory cells is subsequently tracked by the activity module in step 224 to determine the capabilities, current performance, and operational configuration of the memory cells as well as the assorted logical units. It is noted that the activity module can track any number of different data access and memory behavior metrics over time. The tracked data access activity and memory characteristics compiled by the activity module from step 224 allows the activity module to assign workload values to various groups, such as the respective namespaces, that correspond with at least the volume of data accesses conducted for a given length of time. An assigned workload value may be more sophisticated, as directed by the activity module, and can include a compilation of memory cell efficiency and/or reliability with availability. The ability to adapt the tracking of activity for a memory cell and/or logical unit and the generation of a workload value for allows the activity module to conduct more, or less, rigorous processing and time to determine how much system capability is occupied by data access operations initiated by external hosts/users as well as background memory operations, such as garbage collection, memory refresh, and data mapping.

The detected workloads are monitored over time by the activity module while a workload strategy is generated in step 226. The workload strategy establishes when various portions of memory can benefit from reactive and/or proactive operational policy changes that provide data access performance manipulation and sets a workload trigger to prompt execution of at least one memory cell operational policy change action as prescribed by an operational strategy generated in step 226. It is contemplated that the workload strategy, and established triggers, can correspond with activity tracking, system performance analysis, and/or system metric compilation that intelligently conveys what is occurring in the data storage system to one or more hosts/users. The generation of strategies by the activity module in step 226 may further involve generating a tracking strategy that dictates what system information to log and compile as well as a display strategy that dictates who sees what information in what manner.

The correlation of the various system activity and operational strategies with current, pending, and predicted workloads provides intelligent use of system resources to monitor, log, compile, and analyze the flow of data, use of memory cells, and data handling operations. In accordance with the tracking and display strategies, tracked system activity is compiled into a dashboard in step 228 and shown to at least one host/user. As discussed above, the display strategy, in combination with the collection of activities, statistics, and metrics as prescribed by the tracking strategy, can convey multiple different dashboards, different information, and different information granularities to different hosts/users. For instance, the activity module in step 228 can log system activity corresponding to particular activities, data source, data destination, security handling, compression handling, or tag assigned by the activity module prior to displaying such information as part of a dashboard that can provide raw, untranslated information or information translated into a visually optimized format, such as a graph or map.

The presence of one or more system activity dashboards that correspond with strategies that prescribe actions to intelligently track system activity, compile and display the activity to one or more hosts/users, and alter at least one operational memory cell policy allows decision 230 to evaluate if there is any indication that a triggering event will transpire, such as in predetermined workload triggers, detected system activity, and/or predicted system performance volatility. With no triggering event present, routine 220 returns to step 228 where system activity is tracked, logged, and compiled. If a triggering event is detected, or predicted, step 232 activates one or more tracking, display, and/or operational data policy changes in accordance with established strategies to accommodate the triggering workload. For example, step 232 can alter what activity is tracked, where activity is tracked, how tracked information is compiled, how tracked information is analyzed, and how information is displayed to what hosts/users.

At the conclusion of the adaptation of system activity tracking, display, and/or data operational policies in step 232, or in the event no triggering event is detected or predicted, decision 234 evaluates if system activity tracking and/or display can be optimized by altering granularity. That is, decision 234 can hypothetically evaluate with the activity module how much system resources will be expended, or saved, by changing the granularity in which activities are tracked, logged, compiled, analyzed, or displayed. It is noted that granularity can be characterized as the resolution of system information, such as by memory cell, die of memory cells, data storage device, namespace, GCU, most frequently accessed memory cells, least frequently accessed memory cells, or highest error rate.

A change in granularity prompts step 236 to alter at least one system tracking, activity compilation, activity analysis, or activity display. With the granularity altered, or if no granularity change is in order from decision 234, decision 238 evaluates with the activity module if the current activity tracking, compilation, analysis, and display are optimal. The evaluation of decision 234 by the activity module can monitor past and existing system resource expenditures on system activity tracking and display to determine if the execution of future activity tracking and display is optimal. It is noted that optimal can be characterized as utilizing system resources to carry out system activity tracking, compilation, and/or display without actually degrading data access performance for the system or jeopardizing the performance, reliability, or security of satisfying future data access operations.

In the event the activity module determines that a suboptimal system status is present, step 240 alters at least one manner in which activities are tracked, compiled, analyzed, compiled, and/or displayed. Step 240 may, but is not required to, change the actual prescribed actions of one or more strategies in order to optimize the tracking, compilation, analyzing, and display of system activity. Otherwise, step 240 may temporarily suspend one or more activity module strategies in order to maintain optimal system tracking, compilation, and display to one or more hosts/users.

Through the various embodiments of an activity module, an interface (I/F or API) and an analysis engine are utilized with features that enable data to be tracked within a data storage system. The purposes of the tracking is to provide understanding of basic questions such as who, what, when, and where with regard to the data. The data activity may be tracked on a number of different bases, such as by activity, container (bundle), and content, such as an "all data view" or "cross-bundle." Each of these three areas can be characterized as "lenses." Other lenses can be used as desired so these are illustrative and not necessarily limiting.

The activity lens can be viewed as a mechanism that identifies activity, such as through the operation of write operations to write new data to the system and read operations to read stored data from the system. As desired, other activities could be tracked as well, such as internal background operations like data relocation, garbage collections, and cell calibrations, which are performed to support system capacity and performance. Other useful system performance metrics can be monitored and reported as well. Ultimately, the activity lens would likely identify the "who" aspects in the sense of who is using the data for what purposes, who is using or otherwise affecting system performance, and so on. Stated another way, the activity lens evaluates system operation on a user basis.

The container (bundle) lens may examine similar system metrics and statistics, but on a bundle basis. As used herein, the term bundle generally refers to a particular "set" of data that is usually utilized as a group or unit. The bundles can include redundant array of independent disks (RAID) groups, objects, databases, and software containers. It is not necessarily required that the entire container/bundle be accessed, but in many cases this could be a granularity applied to the system as well. Stated another way, activity similar to that discussed above could be applied to the individual bundles, with appropriate information supplied, such as external access activity as well as internal operations. The container lens is thus data set centric and drills down to useful data relating to specific data sets.

The content lens, such as an "all data view" or "cross-bundle," is yet another lens that can be applied to the system. This can be similar to the user activity lens but the focus in this area would be along the line of drilling down into specific, related sets of data. While not necessarily required, tags or other identifiers could be generated, either by the users or automatically by the activity module, to label or classify data sets based on different tags. In this way, activity and other usage information based on subject matter could be evaluated. In a non-limiting example, consider a system that stores a great deal of scientific information in one or more relevant topic areas. Data could be parsed by topic area, or by usage, such as raw data compared to output model data, and so on. This is a data centric lens so that what can be understood is activity style parameters based on related areas of subject matter of the content of the data stored by the system.

While not limiting, in at least some cases the system would include an analysis engine as part of the storage device or system controller functionality. This might be a software/firmware routine operated in the background that monitors ongoing system activity and makes available data structures with the types of data that may be requested. The system would further include API style code that would generate a display interface on a display device of each authorized user. Search terms could be entered by the user for a particular search and the results displayed or transferred in any suitable format. The system might be considered analogous to a search engine style device, but it would be system specific. Maps or other graphical information might be incorporated into the interface to provide an authorized user with a graphical representation of the system status and performance. It is contemplated that the main system would be a keyboard/text interface, but this is not required as other interface options could be used including audio-to-text mechanisms.

With the intelligent utilization of an activity module in accordance with assorted embodiments, a balance can be established and maintained between system resources expended on logging and displaying activity compared to operational policy changes that can optimize system performance and resource allocation. That is, less system resources can be expended on activity tracking and/or display to provide short-term data access performance capabilities in some instances while more system resources can be expended on tracking and/or displaying system activity to provide the activity module an accurate understanding of the status of at least one memory, which leads to operational policy changes that can ensure optimized data access performance, reliability, and security. The correlation of workloads to activity tracking, compilation, and display further provides a balance of system resource expenditure with real-time data access performance.

What is claimed is:

1. A method comprising:
   storing data in the form of data sets to a data repository of a data storage system, the data repository comprising a memory of one or more data storage devices;
   using an analysis engine of an activity module to collect operational information associated with user accesses to at least one of the data sets;
   adjusting what operational information is collected in response to a workload determined by the activity module;
   compiling the operational information into at least one activity with the activity module;
   generating a dashboard to display the at least one activity to a user selected by the activity module; and
   adjusting at least one operational policy for a pending data access request to the data repository in response to the at least one activity shown by the dashboard.

2. The method of claim 1, wherein the analysis module comprises a collection circuit that adjusts what operational information is collected in response to the workload determined by the activity module.

3. The method of claim 1, wherein the analysis module comprises a display circuit to adjust how compiled information is conveyed in the dashboard in response to a workload determined by the activity module.

4. The method of claim 1, wherein the analysis module comprises an analysis circuit to choose how the at least one operational policy is to be adjusted in response to a workload determined by the activity module.

5. The method of claim 1, wherein the at least one operational policy is adjusted in accordance with an operational strategy generated by the activity module.

6. The method of claim 5, wherein the operational strategy is generated by the activity module prior to compiling the operational information.

7. The method of claim 5, wherein the operational strategy prescribes an operational policy to be changed based on a workload to the data repository detected by the activity module.

8. The method of claim 5, wherein the operational strategy prescribes an operational policy to be changed based on a workload to the data repository predicted by the activity module.

9. A method comprising:
storing data in the form of data sets to a data repository of a data storage system, the data repository comprising a memory of one or more data storage devices;
using an analysis engine of an activity module to collect operational information associated with user accesses to at least one of the data sets;
creating a display strategy with the activity module, the display strategy prescribing at least one alteration to how collected information is displayed to a user;
generating a first dashboard to display the collected operational information to a first user in accordance with the display strategy; and
adjusting the first dashboard to a second dashboard in accordance with the display strategy prior to displaying the dashboard to a second user.

10. The method of claim 9, wherein the first dashboard displays information in a grid view with multiple different detected data handling parameters.

11. The method of claim 10, wherein the grid view displays a data source, data destination, data compression, security key, and at least one operational policy used to store data to the data repository.

12. The method of claim 10, wherein the second dashboard displays information in a map view.

13. The method of claim 12, wherein the map view displays operational information with respect to the physical block address in the data repository.

14. The method of claim 10, wherein the second dashboard displays information in a graph view.

15. The method of claim 14, wherein the graph view conveys multiple different data handling parameters with different types of graphs.

16. A method comprising:
storing data in the form of data sets to a data repository of a data storage system, the data repository comprising a memory of one or more data storage devices;
using an analysis engine of an activity module to collect a first set of operational information associated with the data repository;
creating a tracking strategy with the activity module, the tracking strategy prescribing at least one alteration to what operational information is collected;
collecting a second set of operational information associated with the data repository, the second set of operational information being different than the first set of operational information in accordance with the tracking strategy; and
generating a dashboard to display the collected first and second sets of operational information to a user.

17. The method of claim 16, wherein the first set of operation information is displayed to the user by activity and the second set of operational information is displayed to the user by data source.

18. The method of claim 16, wherein the first set of operational information is compiled by the activity module into data access performance statistics to be displayed by the dashboard.

19. The method of claim 16, wherein the second set of operational information has a larger granularity than the first set of operational information.

20. The method of claim 16, wherein the second set of operational information comprises one or more identifying tags inserted by the activity module.

* * * * *